July 25, 1950   N. H. IVERSEN   2,516,518
BROACH BAR ASSEMBLY
Filed May 21, 1948   2 Sheets-Sheet 1
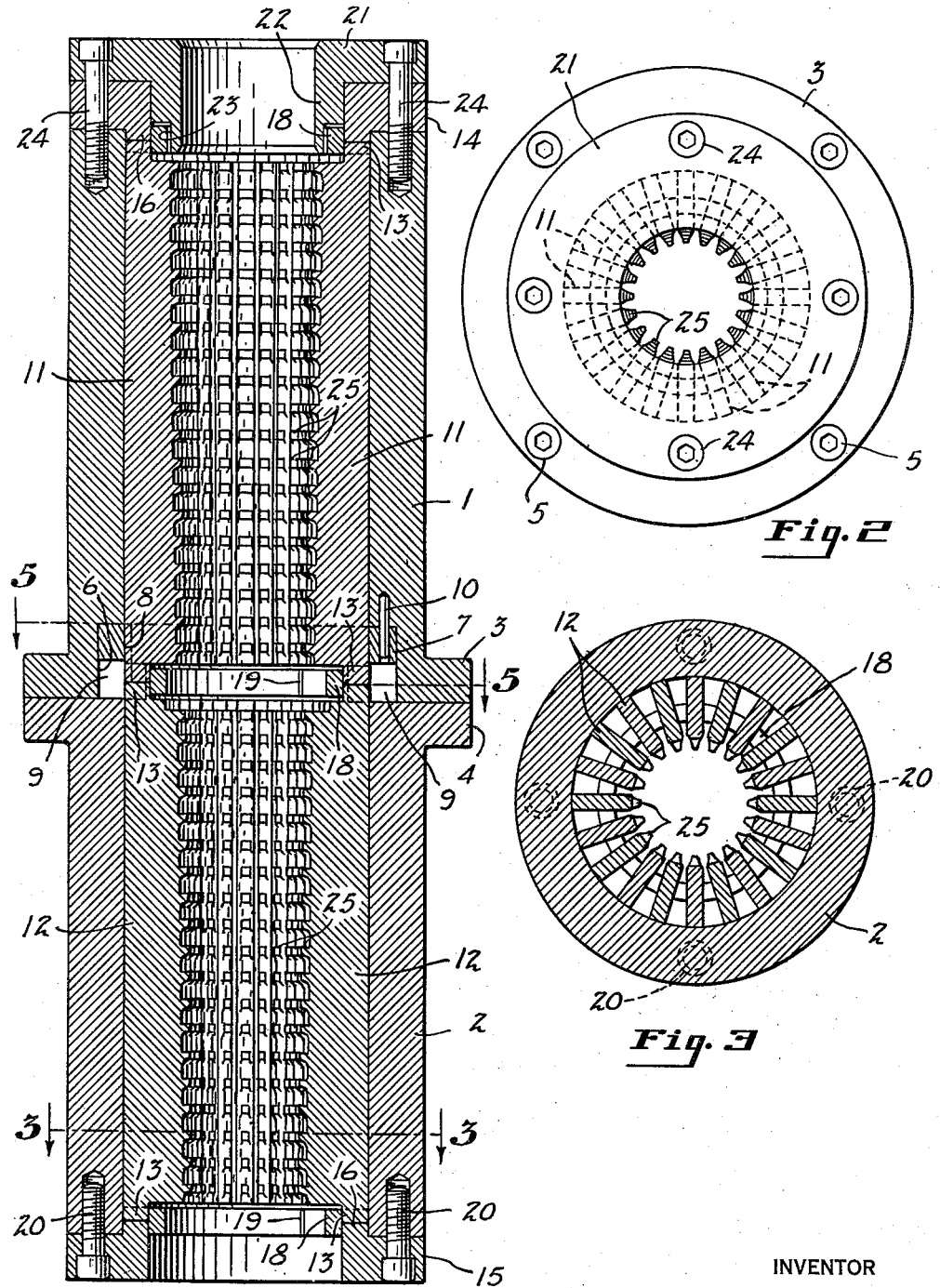
INVENTOR
Norman H. Iversen
BY Evans & McCoy
ATTORNEYS INVENTOR
Norman H. Iversen
BY Evans & McCoy
ATTORNEYS Patented July 25, 1950

2,516,518

UNITED STATES PATENT OFFICE 2,516,518

BROACH BAR ASSEMBLY

Norman H. Iversen, Birmingham, Mich., assignor to The Production Broaching Corporation, Detroit, Mich., a corporation of Delaware Application May 21, 1948, Serial No. 28,298

6 Claims. (Cl. 29—95.1)

This invention relates to a broach assembly in which a series of elongated broach bars are arranged in angularly spaced relation about a central axis for cutting external grooves in work pieces moved axially through the assembly, to form external gear teeth or splines.

The invention has for an object to provide a broach assembly in which a series of longitudinal broach bars are rigidly supported and accurately positioned within a cylindrical backing member by means of holding and spacing members that enable the bars to be quickly and easily assembled or disassembled.

A further object of the invention is to provide an assembly in which the broach bars are positioned by means of intermediate end spacing and holding means that have positioning channels in which the bars fit.

An additional object is to provide bar retainers, in the form of expansible resilient rings, that exert outward pressure on the broach bars to hold them in snug engagement with the backing member.

Reference should be had to the accompanying drawings forming a part of this specification, in which:

Figure 1 is a longitudinal central section through a broach assembly embodying the invention;

Fig. 2 is an end elevation of the assembly;

Fig. 3 is a transverse section taken on the line indicated at 3—3 in Fig. 1;

Figure 4:
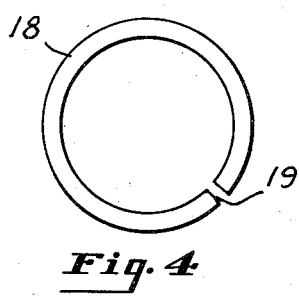
Fig. 4 is a plan view of the split expansible holding ring.
Figure 5:
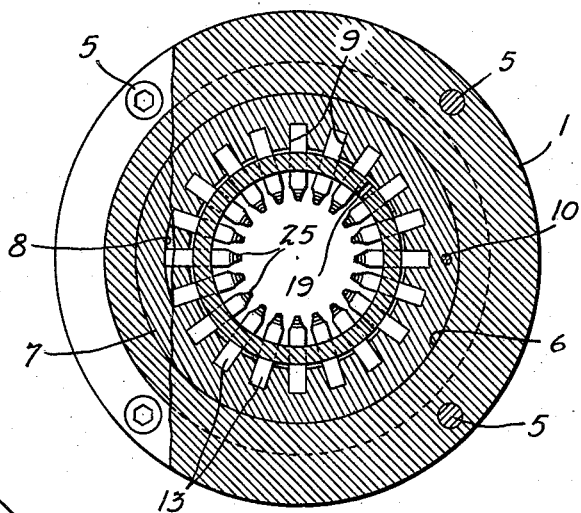
Fig. 5 is a transverse section taken on the line indicated at 5—5 in Fig. 1.
Figure 6:
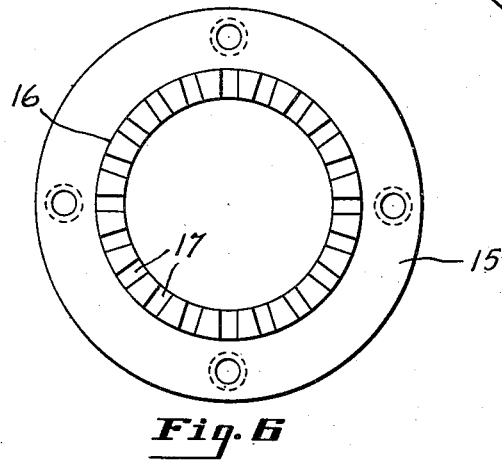
Fig. 6 is a plan view of one of the end retaining rings.
Figure 8:
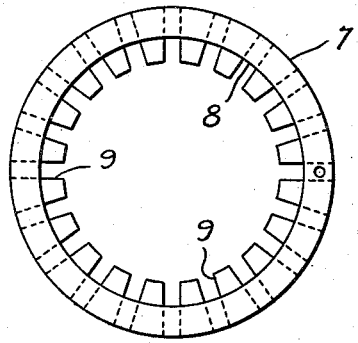
Fig. 8 is a plan view of the intermediate spacing ring.
Figure 7:
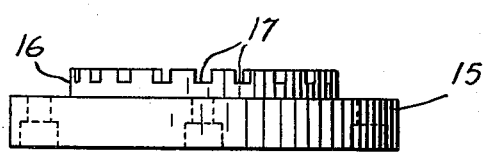
Fig. 7 is a side elevation of the retaining ring shown in Fig. 6.
Figure 9:
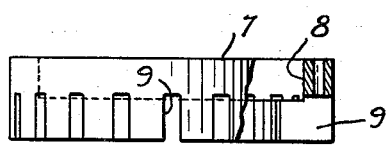
Fig. 9 is a side elevation of the intermediate spacing ring.

The broach assembly of the present invention includes a rigid internally cylindrical backing member preferably composed of sections secured together end to end. As herein shown the backing member is composed of sections 1 and 2 and the adjoining ends of the sections 1 and 2 have outwardly projecting flanges 3 and 4 that are secured together end to end. As herein shown the backing member is composed of sections 1 and 2 and the adjoining ends of the sections 1 and 2 have outwardly projecting flanges 3 and 4 that are secured together by suitable means such as bolts 5.

One of the sections, as herein shown the section 1, is provided with an internal recess 6 at the end thereof that adjoins the section 2 which receives a positioning ring 7 that fits within the recess 6. One end portion of the ring 7 has an internal cylindrical surface 8 substantially flush with the interior of the backing member 1. The opposite end portion of the ring 7 has radial slots or channels 9 that are equally spaced throughout the periphery of the ring, and the ring 7 is accurately positioned and held against circumferential movement by suitable means such as a dowel 10.

The ring 7 serves as an intermediate spacer for longitudinal broach bars mounted within the backing member and is adapted to receive the abutting ends of bars 11 and 12 secured together end to end within the backing member and having their abutting ends fitting in the channels 9 of the ring 7. The bars 11 and 12 taper upwardly and have outer edges that fit against the cylindrical interior of the backing member. The opposite ends of each of the bars 11 and 12 are rabbeted to provide projections 13 that are preferably of uniform width and length. The bars 11 and 12 are retained in the backing member by means of upper and lower retaining rings 14 and 15 each of which is provided with a cylindrical flange 16 that fits within the cylindrical backing member and that is of a radial thickness corresponding to the width of the projections 13, the cylindrical flanges 16 being provided with radial grooves 17 in which the projections 13 fit. The interior faces of the projections 13 are flush with the interiors of the rings 14 and 15 and are engaged by resilient holding rings 18 that press the ends of the bars 11 and 12 against the interior of the backing member.

The projections 13 of the upper and lower bars 11 and 12 that abut in the channels 9 provide circumferentially alined transverse recesses at the joint between the bars to receive a holding ring 18 identical with the rings engaging the projections 13 at the upper and lower ends of the backing member. Each of the rings 18 has a transverse split 19 that permits the ring to become contracted slightly for insertion within the projections 13 of the broach bars, the resiliency of the ring 18 causing it to expand against the projections 13 to press the bar against the interior of the backing member.

The lower retaining ring 15 is secured to the lower end of the holder with its grooves 17 axially alined with the grooves 9 of the intermediate positioning ring by suitable means such as screws 20.

At the upper end of the tubular backing member there is a guide ring 21 that has a cylindrical flange 22 fitting within the upper retaining ring 14 and provided with an external circumferential recess 23 at its lower end to accommodate the upper holding ring 18. The rings 14 and 21 are secured in place with the grooves 17 of the retaining ring 14 alined axially with the grooves 9 of the intermediate ring 7 by suitable means such as screws 24.

The work is fed through the guide ring 21 at the upper end of the broach assembly and is acted upon by teeth 25 formed along the inner upwardly tapering edges of the alined broach bars 11 and 12, and since the teeth of the broach bars are in longitudinal alinement and circumferentially spaced, circumferentially spaced grooves are formed in the work piece as it passes through the broach assembly.

It is to be understood that in accordance with the provisions of the patent statutes variations and modifications of the specific devices herein shown and described for purposes of illustration may be made without departing from the spirit of the invention.

What I claim is:

1. A broach assembly comprising a tubular internally cylindrical backing member, end positioning rings of less internal diameter than said backing member secured to the ends of said member, said positioning rings having alined channels extending radially outwardly from their inner edges, longitudinally tapering broach bars having toothed inner edges and outer edges bearing against the interior of said backing member, said bars having rabbets providing projecting end portions fitting in the channels of said positioning rings, and expansible holding rings engaging projecting end portions of said bars to hold the same against the interior of said backing member.

2. A broach assembly comprising a tubular internally cylindrical backing member, end positioning rings of less internal diameter than said backing member secured to the ends of said member, said positioning rings having alined channels extending radially outwardly from their inner edges, longitudinally tapering broach bars having toothed inner edges and outer edges bearing against the interior of said backing member, said bars having rabbets providing projecting end portions fitting in the channels of said positioning rings, said end portions of the bars having outer faces flush with the interiors of said positioning rings, and expansible holding rings engaging the outer faces of the projecting ends of the bars and the interior of said positioning ring.

3. A broach assembly comprising a tubular internally cylindrical backing member, end positioning rings of less internal diameter than said backing member secured to the ends of said member, said positioning rings having alined channels extending radially outwardly from their inner edges, longitudinally tapering broach bars having toothed inner edges and outer edges bearing against the interior of said backing member, said bars having rabbets providing projecting end portions fitting in the channels of said positioning rings, said end portions of the bars having outer faces flush with the interiors of said positioning rings, expansible holding rings engaging the outer faces of the projecting ends of the bars and the interior of said positioning ring, and a guide ring having a tubular portion fitting within one of said positioning rings and having an inner end portion externally rabbeted to receive the holding ring.

4. A broach assembly comprising a tubular backing member composed of sections secured together end to end, an annular spacing ring of less internal diameter than said sections clamped between adjoining ends thereof, said ring having angularly spaced internal axial channels, end retaining rings of less internal diameter than said backing member detachably secured to the ends of the backing member and having angularly spaced radial channels alined with the channels of said spacing ring, and longitudinally extending broach bars clamped between said retaining rings and having portions fitting in the channels of said retaining and spacing rings.

5. A broach assembly comprising a tubular backing member composed of sections secured together end to end, an annular spacing ring of less internal diameter than said sections clamped between adjoining ends thereof, said ring having angularly spaced internal axial channels, end retaining rings of less internal diameter than said backing member detachably secured to the ends of the backing member and having angularly spaced radial channels alined with the channels of said spacing ring, longitudinal broach bars arranged end to end and having abutting ends positioned in said axial channels of said spacing ring and their opposite ends in said radial channels of said retaining rings, said bars having rabbets at their ends providing projections spaced outwardly from their inner edges, and expansible holding rings engaging said projections to hold said bars against the backing member.

6. A broach assembly comprising a tubular backing member composed of sections secured together end to end, an annular spacing ring of less internal diameter than said backing member clamped between adjoining sections of said backing member, said ring having angularly spaced internal axial channels whose bottoms are substantially flush with the interior of said backing member, longitudinal broach bars having their ends abutting in said axial channels, the abutting ends of said bars being rabbeted to provide transverse inwardly facing circumferentially alined recesses at the adjoining ends thereof, an expansible holding ring in said recesses and pressing said bars against said backing member, and holding rings engaging the ends of said bars at opposite ends of the backing member.

NORMAN H. IVERSEN.

REFERENCES CITED

The following references are of record in the file of this patent:

UNITED STATES PATENTS

| Number | Name | Date |
|---|---|---|
| 439,437 | Smith | Oct. 28, 1890 |
| 1,070,561 | Walker | Aug. 19, 1913 |
| 1,909,840 | Muller | May 16, 1933 |